(12) United States Patent
Adler

(10) Patent No.: US 6,256,015 B1
(45) Date of Patent: Jul. 3, 2001

(54) COMPUTER MOUSE COVER

(76) Inventor: Allan Adler, 3263 Oakdell Rd., Studio City, CA (US) 91604

( * ) Notice: Subject to any disclaimer, the term of this patent is extended or adjusted under 35 U.S.C. 154(b) by 0 days.

(21) Appl. No.: 09/664,995

(22) Filed: Sep. 18, 2000

Related U.S. Application Data

(63) Continuation-in-part of application No. 09/474,556, filed on Dec. 29, 1999, now abandoned.

(51) Int. Cl.$^7$ .................................................... G09G 5/08
(52) U.S. Cl. ................................. 345/163; D14/402
(58) Field of Search .................. 345/163–166, 345/157; D14/402, 403, 404, 405, 406, 407, 408, 409, 410, 454; 200/333

(56) References Cited

U.S. PATENT DOCUMENTS

| | | | | |
|---|---|---|---|---|
| D. 291,203 | * | 8/1987 | Silver ................................. | D14/454 |
| D. 343,392 | * | 1/1994 | harden et al. ...................... | D14/403 |
| D. 370,219 | * | 5/1996 | Blumer et al. ..................... | D14/403 |
| D. 381,015 | * | 7/1997 | Morrison et al. .................. | D14/454 |
| D. 386,164 | * | 11/1997 | Silberstein ......................... | D14/454 |
| D. 420,992 | * | 2/2000 | Hu ...................................... | D14/454 |
| 5,245,146 | * | 9/1993 | Florence ............................. | 200/333 |
| 5,680,157 | * | 10/1997 | Bidiville et al. ..................... | 345/163 |
| 5,851,623 | * | 12/1998 | Tarulli et al. ....................... | D14/402 |
| 6,099,934 | * | 8/2000 | Held ................................... | 200/333 |

* cited by examiner

*Primary Examiner*—Regina Liang
(74) *Attorney, Agent, or Firm*—Don C. Lawrence

(57) ABSTRACT

A cover for a computer mouse has a concavo-convex shell having a concave lower surface shaped to conform generally to the upper surface of a computer mouse and a front section that tapers forwardly and downwardly from a front end of the mouse to form a rounded nose. The shell has two apertures suggestive of eyes extending through it, each overlying a respective one of two finger-actuated buttons on the mouse, and though which, in one embodiment, the buttons on the mouse can be manipulated by the fingers of a user's hand. The shell further includes a pair of parallel, longitudinal depressions suggestive of ears formed on its upper surface. The depressions extend rearward from a corresponding one of the apertures, and are respectively adapted to receive the lower surface of a respective one of the user's fingers and align it with a respective one of the buttons.

20 Claims, 3 Drawing Sheets

COMPUTER MOUSE COVER

RELATED APPLICATIONS

This application is a continuation-in-part of U.S. application Ser. No. 09/474,556, filed Dec 29, 1999, now abandoned.

BACKGROUND OF THE INVENTION

1. Field of the Invention

This invention pertains to peripheral devices for computers in general, and in particular, to a cover for a computer mouse.

2. Description of the Related Art

Since its development at the Xerox Palo Alto Research Center ("PARC") more than twenty years ago, the familiar computer mouse has become a ubiquitous and almost indispensable input device for users of personal computers.

The typical computer mouse comprises a hollow plastic body having a convex upper surface, a front portion that includes two or more finger-actuated buttons and/or wheels, a rear and middle portion shaped to conform to the palm and heel of a user's hand, and a generally planar bottom surface having bearings, a ball, rollers or wheels protruding from it that enable the mouse to be rolled about on a flat surface by the user's hand to effect a corresponding movement of a pointer or a cursor on the display of a computer to which the mouse is connected, typically by means of a cable.

Over the years, a number of protective, and/or ornamental covers for a computer mouse have been developed. These include an automobile-shaped mouse cover described in U.S. Pat. No. 5,245,146 to L. K. Florence, a resilient, basketball-shaped mouse cover described in U.S. Pat. No. 5,851,623 to D. J. Tarulli, et al., and the variously shaped ornamental mouse covers illustrated in the following U.S. Design Patents: U.S. Pat. Des. No. 291,203 to G. S. Silver; U.S. Pat. No. 343,392 to D. Harden, et al.; U.S. Pat. No. 370,219 to S. Blumer; U.S. Pat. No. 381,015 to R. Q. Morrison, et al.; and, U.S. Pat. No. 386,164 to H. L. Silberstein. While each of the foregoing mouse covers provides some advantages, they also have certain attendant disadvantages involving, e.g., complexity, manufacturing cost, weight, difficulty of assembly, and/or reliability of operation.

I have invented a novel mouse cover that helps to protect the mouse from penetration by dirt, lint, oil, and moisture from the user's hand. Moreover, my new mouse cover is light in weight, inexpensive to make, simple to assemble, extremely reliable in operation, and pleasurable to look at, touch, and use.

BRIEF SUMMARY OF THE INVENTION

My novel computer mouse cover comprises a concavo-convex shell having a generally convex upper surface, a generally concave lower surface, and front, middle and rear sections. The front section of the shell tapers downward and forward over the front portion of the mouse to form a rounded nose on the front section of the shell. At least one of the middle and rear sections has a lower surface with at least one point thereon that is disposable in immediate opposition to a corresponding point on a respective one of at least one of the front and rear portions of the mouse. The middle section of the shell has a pair of apertures extending through it. Each aperture is positioned to overlie a corresponding button on a front portion of the mouse such that each button can be directly actuated with a finger of the user's hand.

In another possible embodiment, the buttons on the mouse are indirectly actuated through the agency of a pair of lever arms disposed between the lower surface of the shell and an upper surface of the mouse. Each arm has a first end pivotally fixed between the lower surface of the shell and the upper surface of the mouse, and a second end that pivots about the first end of the arm into and out of direct, actuating engagement with a corresponding one of the buttons on the mouse. A pad on the arm protrudes through a corresponding one of the apertures in the shell for direct contact by a corresponding one of the user's fingers.

The upper surface of the middle section of the shell further includes a pair of parallel, U-shaped, longitudinal depressions suggestive of "ears" extending rearward from corresponding ones of the apertures in the shell. The depressions are adapted to receive the lower surface of two fingers of the user's hand and align them with corresponding ones of the apertures. The shell further includes a downward-facing rim at its lowermost extent. When the cover is mounted on the mouse, the rim lies in a plane that is parallel to and spaced even with or slightly above the planar bottom surface of the mouse. The "nose" end of the shell includes an opening through which a cable extending from the front of the mouse can be extended for connection to a computer.

In use, the cover fits down closely over the mouse to completely cover its upper surface, and is held there by, e.g., an adhesive.

A better understanding of the above and other features and advantages of my new mouse cover may be obtained from a consideration of its detailed description below, particularly if considered in conjunction with the figures of the accompanying drawings.

DETAILED DESCRIPTION OF THE INVENTION

Figure 1:
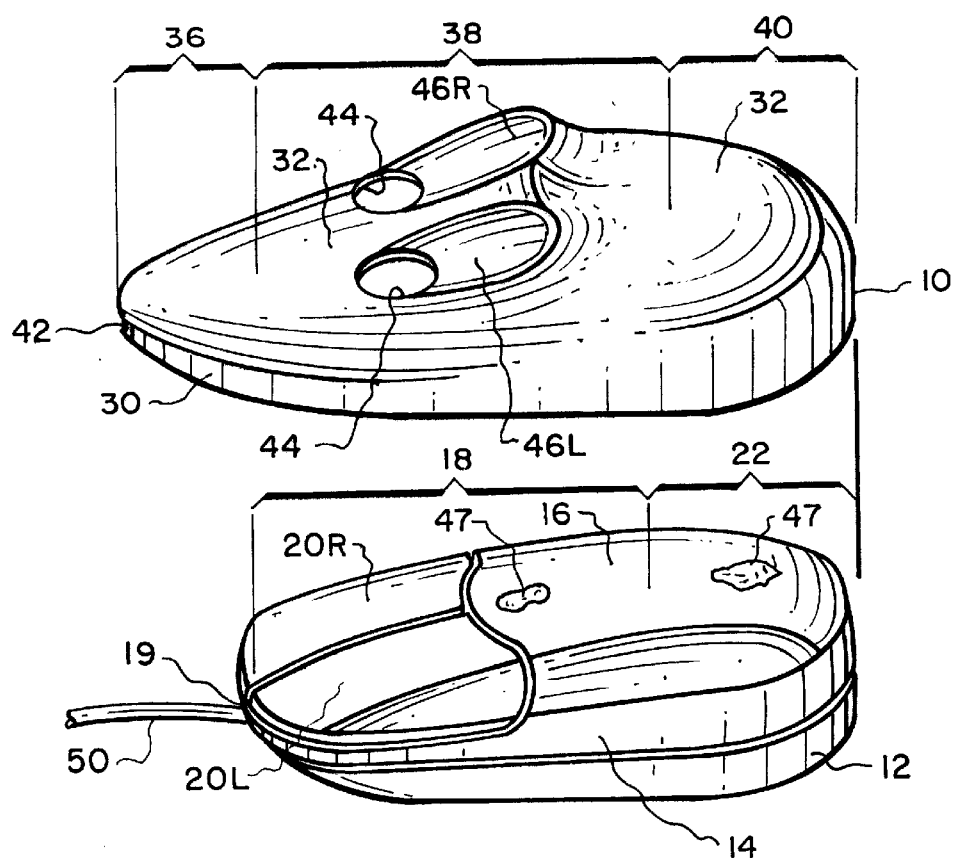
FIG. 1 is a top, side perspective view showing one exemplary embodiment of my new mouse cover positioned above a conventional, two-button computer mouse.

FIG. 1 is a top, left side perspective view of a first exemplary embodiment of my novel cover 10 for a computer mouse 12. In FIG. 1, the cover 10 is shown suspended above the mouse 12 to which it is to be assembled. The mouse 12 is a conventional two-button mouse of a known type with a hollow plastic body 14 having a generally convex upper surface 16, a front portion 18 that includes a front end 19 with a connection cable extending out of it, left and right finger-actuated pushbuttons 20L and 20R, a rear portion 22 shaped to conform to the palm and heel portion of a user's hand 24 (see FIG. 2), and a generally planar bottom surface 26 (see FIGS. 4 and 5) having a plurality of bearings 28 or the like thereon to provide reduced friction sliding of the mouse over a flat rolling surface, such as the top of a desk or a "mouse pad."

A ball, rollers, wheels, or the like (not illustrated) protrude from the bottom surface 26 of the mouse 12 to make frictional rolling contact with the rolling surface, and when appropriately configured and connected to an associated computer (not illustrated), movement of the mouse over the surface by the user's hand 24 is translated into a corresponding movement of a cursor or pointer on the display of the computer. The buttons 20 L and 20R on the mouse 12 can be actuated to e.g., "select" an object pointed to on the display with the cursor. The mouse 12 may optionally include a third actuating button or wheel (not illustrated) positioned between the illustrated buttons 20L and 20R.

Figure 3:
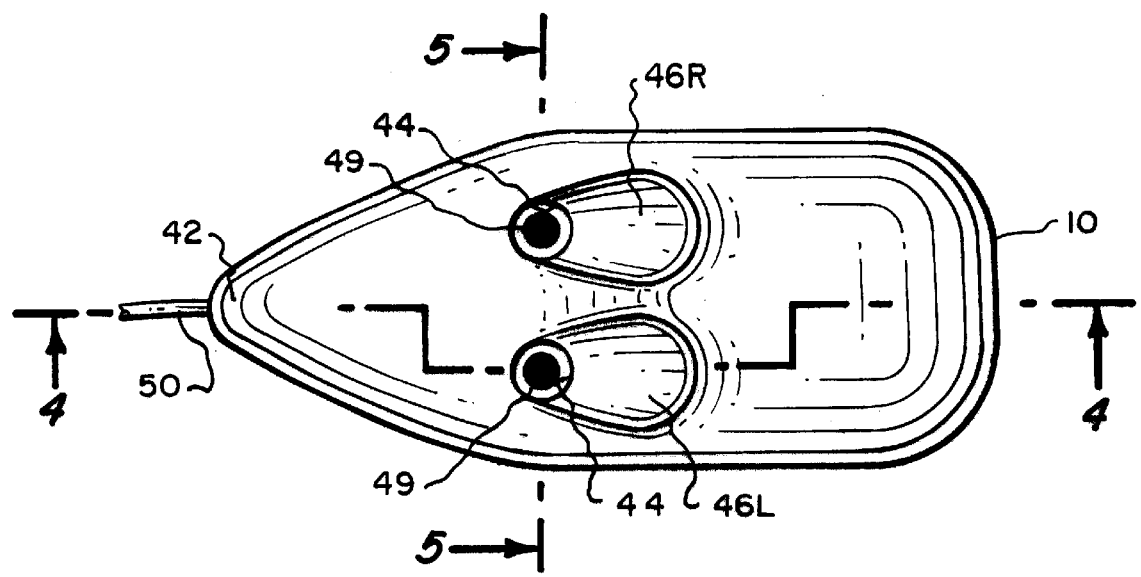
FIG. 3 is a top plan view of the mouse cover shown in FIGS. 1 and 2.

The cover 10 comprises a concavo-convex shell 30 having a generally convex upper surface 32, a generally concave lower surface 34 (see FIGS. 4 and 5), and front, middle and rear sections 36, 38 and 40 (see FIGS. 1 and 3). The front section 36 of the shell 30 tapers downward and forward over the front end 19 of the mouse body 14 to form a rounded "nose" 42 on the front section 36 of the shell 30.

The middle and rear sections 38 and 40 of the shell 30 generally conform in shape to that of the front and rear portions 18 and 22, respectively, of the mouse 12 such that at least one of the middle and rear sections 36 and 38 of the shell 30 has a lower surface with at least one point thereon disposed in immediate opposition to a corresponding point on a corresponding one of the upper surfaces of at least one of the front and rear portions 18 and 22 of the mouse body 14 when the cover 10 is mounted on the mouse.

Figure 4:
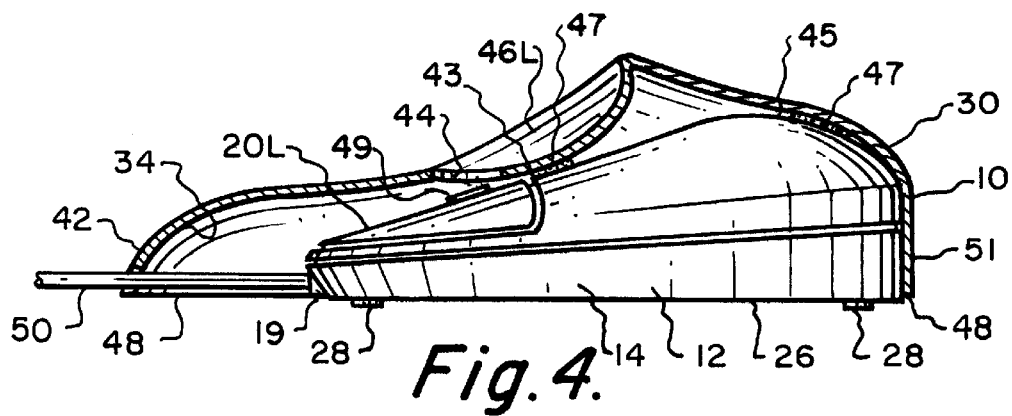
FIG. 4 is a cross-sectional elevation view looking into the left side of the mouse cover mounted on the mouse, as revealed by the section taken along the lines 4—4 in FIG. 3.

In the embodiment illustrated in FIG. 4, two such sets of opposing points 43 and 45 are shown, one between the middle section 38 of the shell 30 and the front portion 18 of the mouse 12, and another between the rear section 40 of the shell and the rear portion 22 of the mouse. In one preferred embodiment, there are at least three such sets of corresponding points, preferably distributed between the corresponding, opposing surfaces of the mouse 12 and shell 30 so as to define the corners of a triangle. These sets of opposing points between the shell 30 and the mouse body 14 define advantageous locations for dispensing small dabs 47 of, e.g., a resilient adhesive, for attaching the cover 10 to the mouse 12 (see FIGS. 1 and 4).

The middle section 38 of the shell 30 has a pair of apertures 44 extending through it. Each of the apertures 44 is positioned in the shell 30 to overlie a corresponding one of the buttons 20L and 20R on the front portion 18 of the mouse 12 such that each button can be directly actuated with a finger of the user's hand 24, e.g., with the index and middle or ring fingers, and in particular, with the tips thereof (see FIG. 2).

The apertures 44 may be round or oval in shape, and as illustrated in FIG. 3, may be respectively disposed over a two- or 3-dimensional representation of an eye 49, such as a decal, or a glued-on dot, positioned on a corresponding one of the upper surfaces of the pushbuttons 20L, 20R of the mouse 12 to give it the appearance of having a pair of eyes.

The upper surface 32 of the middle section 38 of the shell 30 also includes a pair of parallel, longitudinal depressions 46L and 46R, respectively, that are suggestive of "ears." Each of the depressions 46L, 46R extends rearward from a corresponding one of the two apertures 44, which, in turn, overlie a corresponding one of the pushbuttons 20L and 20R. The depressions 46L and 46R are thus positioned and shaped to receive the respective lower surfaces of two of the user's fingers, e.g., the index and middle or ring fingers, and to align the tips of the two fingers for direct contact with a corresponding one of the two pushbuttons 20L and 20R.

Figure 2:
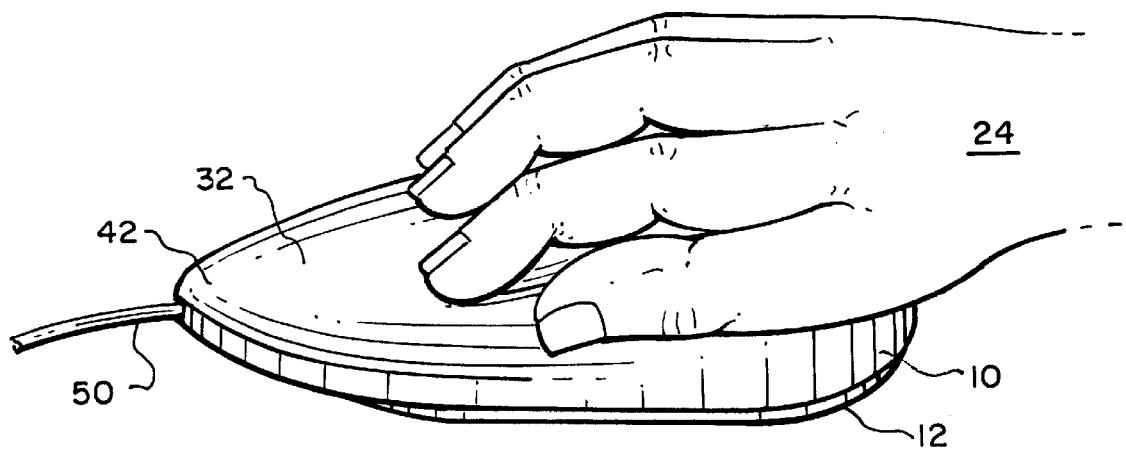
FIG. 2 is a top, side perspective view showing the mouse cover positioned down over the upper surface of the mouse, with the hand and fingers of a user positioned in operating contact with the upper surface of the mouse cover.

In FIG. 2, the index and middle fingers of a right-handed user 24 are shown positioned in a respective one of the two longitudinal depressions 46L, 46R, with the ends of the fingers in respective direct contact with the push buttons 20L and 20R through respective apertures 44. The user's thumb is positioned on the left side of the covered mouse 12, and the user's ring and little fingers are positioned on the right side thereof. Additionally, since the shell 30 is symmetrical about a medial plane, my mouse cover 10 is "ambidextrous," i.e., is easily adapted for use by a left-handed user by simply exchanging the functions of the actuating buttons 20L and 20R with each other.

Figure 5:
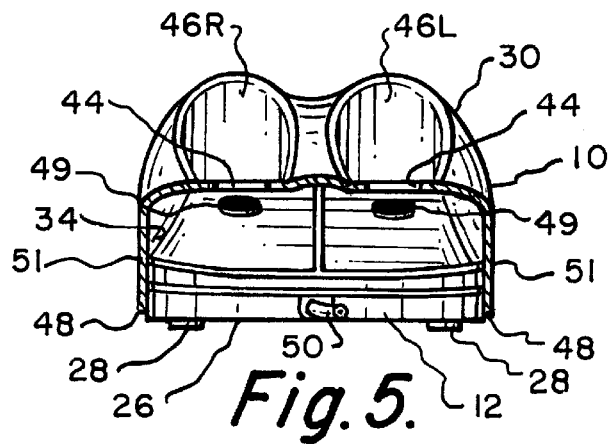
FIG. 5 is a cross-sectional elevation view looking toward the rear of the mouse cover mounted on the mouse, as revealed by the section taken along the lines 5—5 in FIG. 3.

The shell 30 of the cover 10 further includes a generally vertical skirt 51 (see FIGS. 4 and 6) around its middle and rear sections 38 and 40 that ends in a rim 48 extending around the entire perimeter of the concave lower surface 34 of the shell at its lowermost extent (see FIGS. 4 and 5). The rim 48 lies in a plane that is parallel to and spaced at, or slightly above, the planar bottom surface 26 of the mouse 12 when the cover IO is mounted thereon. The spacing between the rim 48 and the bottom surface 26 of the mouse 12 can vary from between about 0 to 0.125 inches, but it is preferable that the rim not extend below the bottom surface of the mouse to prevent the possibility of its dragging on the surface over which the covered mouse is rolled.

Figure 8:
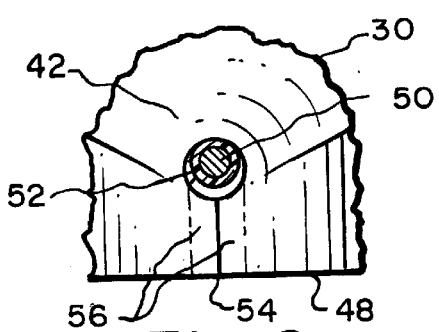
FIG. 8 is partial front elevation view of the front end of the mouse cover, as taken along the lines 8—8 in FIG. 6, showing one embodiment of an opening for a connecting cable.

In typical embodiments, the mouse 12 connects to an associated computer (not illustrated) by means of a cable 50 that extends out of the front end 19 of the mouse. In one possible embodiment of the cover 10 (see FIG. 8), to accommodate passage of the cable 50 through the shell 30, the rounded nose 42 on the front of the shell is provided with an opening 52 for the cable. In this embodiment, the cable 50 can be conveniently inserted into the opening 52 without detaching it from the mouse 12 at one end, or a connector (not illustrated) at the other, by cutting a slit 54 in the shell 30 that extends from the rim 48 to the opening. If the material of the shell 30 is sufficiently ductile, two "flaps" 56 on either side of the slit 54 (see FIG. 8) can then be temporarily spread sufficiently apart to permit insertion of the cable 50 into the opening 52, and the two flaps then closed together again to captivate the cable therein. If desired, a bead of a resilient adhesive, e.g., silicon rubber, can be dispensed around the circumference of the cable 50 inside of the opening 52 to function as a protective grommet that prevents chaffing of the cable.

Figure 9:
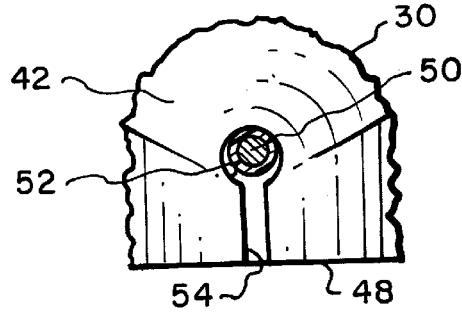
FIG. 9 is a partial front elevation view of the front end of the mouse cover similar to that shown in FIG. 8, showing an alternative embodiment of an opening for a connecting cable; and, FIG. 10 is a perspective view of a button actuating lever arm used in one embodiment of the mouse cover for indirect actuation of the mouse buttons.

As illustrated in FIG. 9, if the cable 50 is sufficiently resilient, the slit 54 can be widened into a permanent slot 56 extending from the rim 48 to the opening 52, thereby giving the opening a "keyhole" appearance. The slot 54 has a width that is less than the undeformed width of the cable 50, and the cable can be inserted into the opening 52 by flattening it to the width of the slot, inserting it through the slot into the opening, and then re-molding the cable to its natural, undeformed shape in the opening 52. As in the above embodiment, a bead of a resilient adhesive can be dispensed around the circumference of the cable 50 inside of the opening 52 to captivate the cable in the opening and function as a protective grommet that prevents chaffing of the cable.

The cover 10 is easily assembled onto the mouse 12 by simply "plugging" the upper surface of the mouse into the complementary "socket" defined by the generally lower surface of the shell 30. As described above and shown in FIGS. 1 and 4, the cover 10 can be attached to the mouse by dispensing small dabs 47 of a resilient adhesive, e.g., between two immediately opposing points on the mouse and the shell 30 before their assembly so that the adhesive is squeezed between the two opposing surfaces locally and adheres to both of them. In this regard, it may be noted that the typical computer mouse 12 currently on the market can be completely cleaned, serviced and repaired with access to only the bottom surface 26 of the mouse, so that there is little need to make the cover 10 easily removable. However, if desired, the cover 10 can be made more easily removable by using, e.g., a heat-releasable adhesive such that, by heating the shell 30 locally at the adhesively attached points 44, 45 with, e.g., a jeweler's torch, the adhesive will release and permit the cover to be removed from the mouse.

Figure 6:
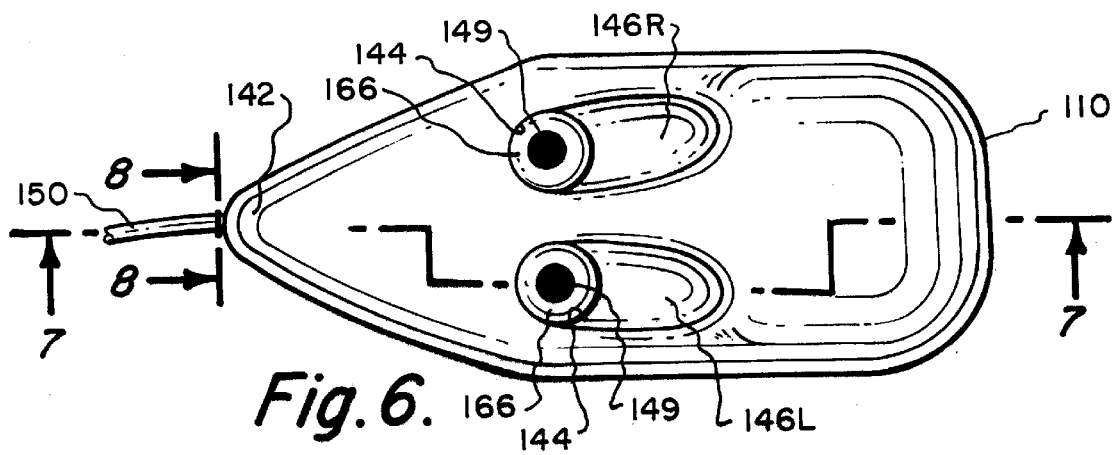
FIG. 6 is a top plan view of a second exemplary embodiment of my mouse cover.
Figure 7:
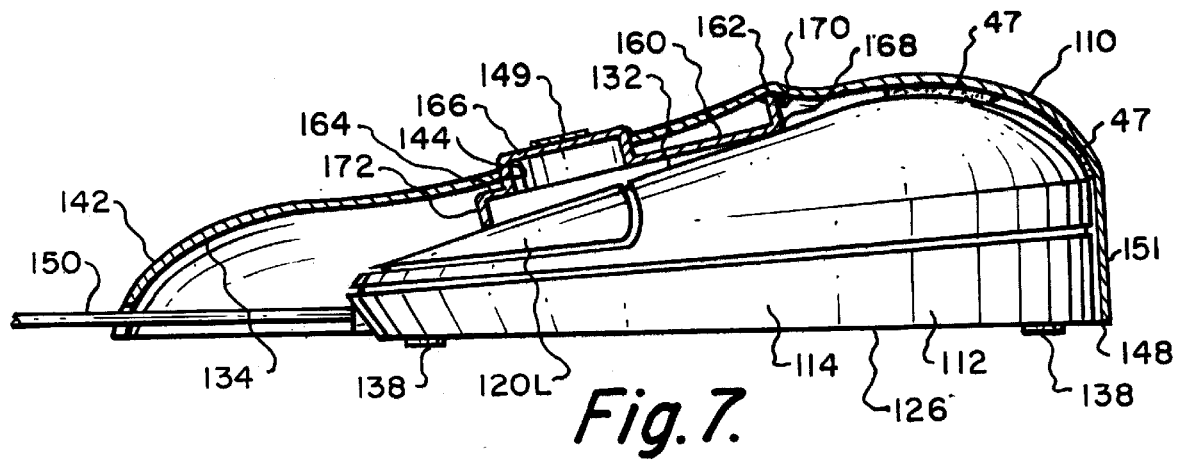
FIG. 7 is a cross-sectional elevation view looking into the left side of the second embodiment of mouse cover mounted on a computer mouse, as revealed by the section taken along the lines 7—7 in FIG. 6.

A second exemplary embodiment of my mouse cover 110 is shown in top plan and cross-sectional side elevation views of FIGS. 6 and 7, respectively. The second embodiment of cover 110 is very similar to the first embodiment 10, and accordingly, similar or identical features thereof are identified by reference numerals obtained by adding 100 to the corresponding reference numeral of the first embodiment.

The second embodiment of my mouse cover 110 differs principally from the first embodiment 10 by the provision in the former of means for enabling the user to indirectly actuate the buttons 120L and 120R on the mouse 112 with his or her fingers. This additional feature is advantageous for users whose finger tips are too large to reliably actuate the buttons 120L and 120R directly through the two apertures 144.

Figure 10:
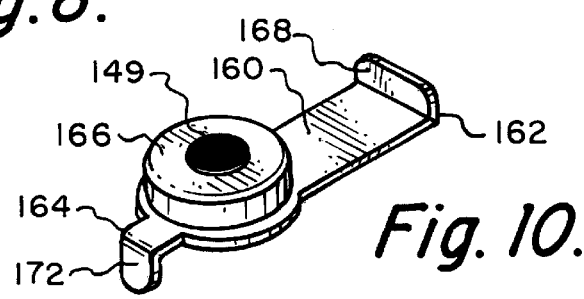

In the particular exemplary embodiment illustrated in the figures, these means comprise a lever arm 160 disposed between the upper surface 132 of the mouse 112 and the lower surface 134 of the cover 110. The arm 160, which is shown in the perspective view of FIG. 10, has a first end 162 pivotally fixed between the opposing surfaces of the mouse 112 and cover 110, and a second end 164 that pivots about the first end into and out of direct, actuating abutment with a corresponding one of the buttons 120L and 120R on the mouse. A finger pad 166 is positioned on the arm 160 to protrude through a corresponding one of the apertures 144 in the cover 10 for direct contact by a corresponding one of the user's finger tips.

In the particular embodiment illustrated, the first end 162 of the arm 160 has a right-angled flange 168 fixed in a pivoting abutment with the lower surface of the cover 10 by a bead 170 (see FIG. 7) of a resilient adhesive, and the second end 164 of the arm has a right-angled finger 172 in pushing abutment with the corresponding one of the buttons 120L or 120R on the mouse 112. As in the first embodiment, a two- or three-dimensional representation of an eye 149, such as a decal, or an engraved dot, can be positioned on the upper surface of the pads 166 to give the covered mouse 112 the appearance of having a pair of eyes.

The lever arm 160 is effectively captivated between the opposing surfaces of the mouse 112 and the cover 110, as well as by the finger pad 166 extending through the corresponding aperture 144. Thus, the bead 170 of resilient adhesive at the first end 162 is not essential, but serves primarily to position the arm 160 appropriately during assembly of the cover 110 to the mouse 112, and to keep the pad 166 centered in the aperture 144 during use. Similarly, no resilient means are required for returning the arm 160 to its original position after actuation, as this function is already present in the buttons 120L and 120R of the conventional mouse 112, although such means could be added, if desired.

As those of skill in the art will recognize, other means 160 for indirectly actuating the buttons on the mouse 112 with the fingers of the user's hand can be provided in lieu of the lever arm 160. For example, a simple pad 166 without an arm 160 could be attached to the upper surface of a corresponding one of the buttons 120L and 120R of the mouse 112 such that it protrudes upwardly through a corresponding aperture 144 for direct contact by a corresponding one of the user's fingers. However, the lever arm 160 illustrated does provide some advantages over that design in terms of its flexibility of finger pad 166 location and mechanical advantage provided by the lever effect.

The shell 30 or 130 of my mouse cover 10 or 110 can be made from a variety of materials, including, without limitation, metal, wood, paper, and even hand-tooled leather. It can also be manufactured easily and efficiently using a variety of fabrication methods, including thermoforming, injection molding and die stamping. As I am a silversmith by profession, one of my preferred materials is 20-gauge (about 0.032 in. thick) sheet-stock of sterling silver, i.e., an alloy comprising 925 parts of silver to 75 parts of copper, which I die-stamp at room temperature with a pair of male-female steel dies that have been precisely machined to match the configuration of the body 14 of a particular, off-the-shelf mouse 12.

I have found that if sufficient "detail" is included in the dies, then a virtually fully-completed mouse cover 10, including the concavo-convex shape of the shell 30, 130, the "eye" aperture(s) 44, 144, the "ear" depressions 46, 146, a smooth, fully trimmed rim 48, 148 at the bottom of the shell 30, 130, the cable opening 52, 152 and any markings desired, can all be obtained in a single stamping operation, with little or no additional hand-forming operations required. Alternatively, the shell 30, 130 can be formed up and trimmed in one operation, and the apertures 44, 144 and/or cable opening 52, 152 can be stamped or punched in the shell in one or more secondary operations. The lever arms 160 of the second embodiment 110 can also be produced in a simple stamping operation.

Various finishing processes can also be applied advantageously to my mouse cover 10, 110. One finishing method that I have used with satisfactory results includes dipping the shell 30, 130 in an aqueous solution of sulfur to form an intense, black "tarnish" over the entire surface of the shell, then polishing the exterior surface of the shell to a bright, lustrous shine with a buffing pad or wheel.

A mouse cover 10, 110 of sterling silver produced using the above methods results in a product that has a rich "look and feel" to it, one which has a smooth, shiny, attractive surface texture that develops a unique wear "patina" with use over time. If desired, the cover 10, 110 can be engraved with, e.g., the user's initials, a family crest or coat of arms, or in a "commemorative" model, a sentiment and/or company logo. In a more ornate or "fancy" embodiment, is possible to attach one or more silver or copper "bezels" around the perimeter of the cover and to inset semi-precious stones, such as turquoise or the like, therein.

Indeed, those of skill in the art will by now recognize that many variations and modifications of my mouse cover are possible in terms of its configuration, materials, and methods of manufacture without departing from the scope and spirit of my invention. Accordingly, the scope of my invention should not be limited to that of the particular exemplary embodiments described and illustrated herein, but rather, should be commensurate with that of the following claims and their equivalents.

I claim:

1. An improved computer mouse of a type that has a body with a generally convex upper surface, front and rear ends, a front portion having a pair of finger-actuated buttons on an upper surface thereof, a rear portion having an upper surface shaped to conform generally to the palm and heel of a user's hand, and a generally planar bottom surface having means thereon for enabling the mouse to be moved about on a flat surface by the user's hand and for translating that movement into a corresponding movement of a cursor on a display of a computer to which the mouse is connected, the improvement in combination therewith comprising:

a cover having a generally convex upper surface, a generally concave lower surface, and front, middle and rear sections, the front section tapering downward and forward over the front end of the mouse body to form a rounded nose on the front section of the cover, at least one of the middle and rear sections having a lower surface with at least one point thereon disposed in immediate opposition to a corresponding point on a corresponding one of the upper surfaces of at least one of the front and rear portions of the mouse body, and the middle section having a pair of apertures therethrough, each aperture overlying a corresponding one of the buttons on the front portion of the mouse such that each button can be directly actuated with a finger of the user's hand.

2. The computer mouse of claim 1, further comprising means disposed between the upper surface of the mouse and the lower surface of the cover for indirectly actuating the buttons on the mouse with the fingers of the user's hand.

3. The computer mouse of claim 2, wherein the means for indirectly actuating the buttons on the mouse comprises an arm having a first end pivotally fixed between the lower surface of the cover and the upper surface of the mouse, a second end pivoting about the first end into and out of direct, actuating engagement with a corresponding one of the buttons on the mouse, and a pad on the arm protruding through a corresponding one of the apertures in the cover for direct contact by a corresponding one of the user's fingers.

4. The computer mouse of claim 3, wherein the first end of the arm has a right-angled flange in pivoting abutment with the lower surface of the cover, and the second end of the arm has a right-angled finger in pushing abutment with the corresponding one of the buttons on the mouse.

5. The computer mouse of claim 1, further comprising a pair of longitudinal depressions formed into the upper surface of the middle section of the shell and extending rearward from a corresponding one of the apertures for respectively receiving a corresponding one of the lower surfaces of the fingers of the user's hand and for aligning the finger with a corresponding one of the buttons on the mouse.

6. The computer mouse of claim 1, wherein the cover further includes a rim lying in a plane that is parallel to and disposed at about the planar bottom surface of the mouse.

7. The computer mouse of claim 6, wherein the mouse is connected to the computer by a cable, and wherein the nose of the cover includes an opening through which the cable passes.

8. The computer mouse of claim 7, wherein the cable is resiliently deformable, and wherein the nose of the cover further includes a slot extending from the rim to the cable opening, the slot having a width less than the undeformed width of the cable.

9. The computer mouse of claim 1, further comprising means for attaching the cover to the mouse.

10. The computer mouse of claim 9, wherein the means for attaching the cover to the mouse comprises an adhesive.

11. The computer mouse of claim 1, wherein each of the apertures in the cover is disposed over a representation of an eye disposed on an upper surface of a corresponding one of the buttons on the mouse.

12. The computer mouse of claim 3, wherein the pad has a representation of an eye disposed on an upper surface thereof.

13. The computer mouse of claim 1, wherein the cover comprises metal, wood, paper, or leather.

14. The computer mouse of claim 11, wherein the metal comprises an alloy of silver.

15. A cover for a computer mouse, comprising:

a shell having a generally convex upper surface, a generally concave lower surface, and front, middle and rear sections, the front section tapering downward and forward to form a rounded nose on the front section of the shell, the middle and rear sections each having a lower surface with at least one point thereon disposable in immediate opposition to a corresponding point on a respective one of front and rear portions of the mouse, and the middle section having a pair of apertures therethrough, each aperture being positioned to overlie a corresponding button on a front portion of the mouse such that each button can be directly actuated with a finger of a user's hand.

16. The cover of claim 15, further comprising means disposed below the lower surface of the shell for indirectly actuating the buttons on the mouse with the fingers of the user's hand.

17. The cover of claim 16, wherein the means for indirectly actuating the buttons on the mouse comprises an arm having a first end pivotally attached to the lower surface of the shell, a second end pivoting about the first end into and out of direct, actuating engagement with a corresponding one of the buttons on the mouse, and a pad on the arm that protrudes through a corresponding one of the apertures in the shell for direct contact by a corresponding one of the user's fingers.

18. The cover of claim 17, wherein the pad has a representation of an eye disposed on an upper surface thereof.

19. The cover of claim 15, further comprising a pair of longitudinal depressions formed into an upper surface of the middle section of the shell and extending rearward from a corresponding one of the apertures for respectively receiving a corresponding one of the lower surfaces of the fingers of the user's hand and for aligning the finger with a corresponding one of the buttons on the mouse.

20. The cover of claim 15, wherein the shell has an opening for a cable through it and means for introducing the cable into the opening transversely thereto.

* * * * *